April 2, 1968 S. B. NORRIS, JR 3,375,913
BALANCED DRINKING WATER VENDORS
Filed Jan. 17, 1966
4 Sheets-Sheet 4

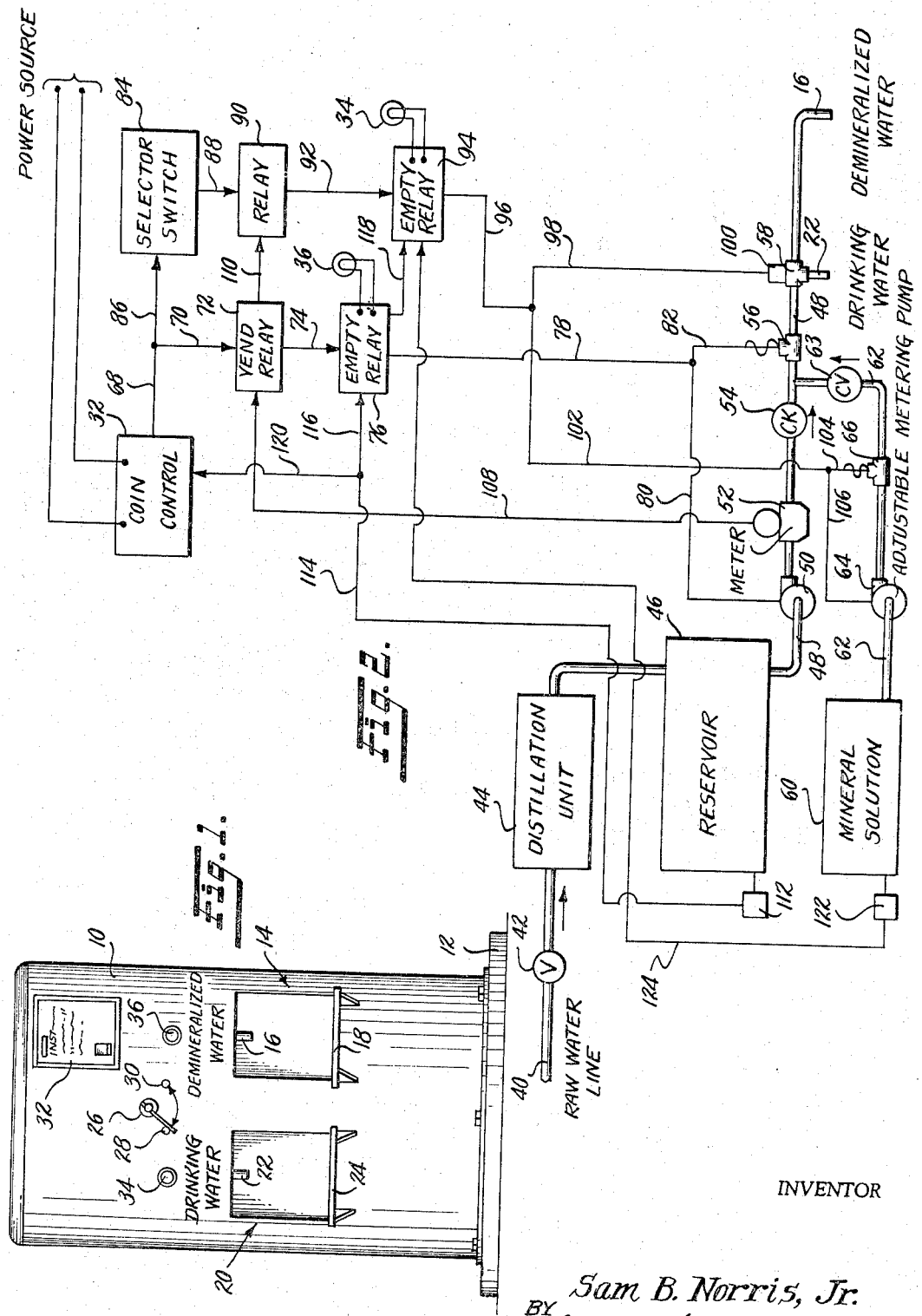

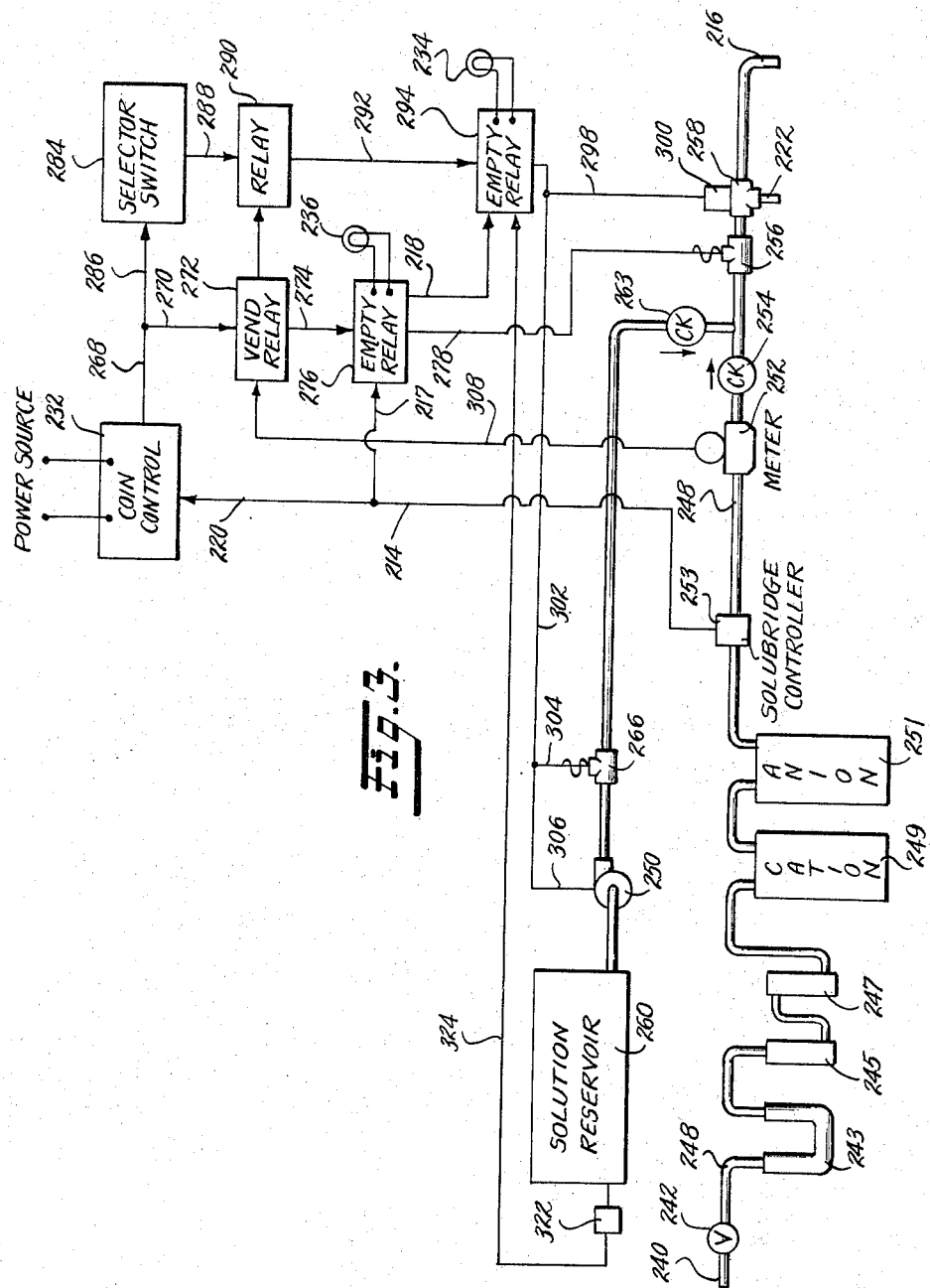

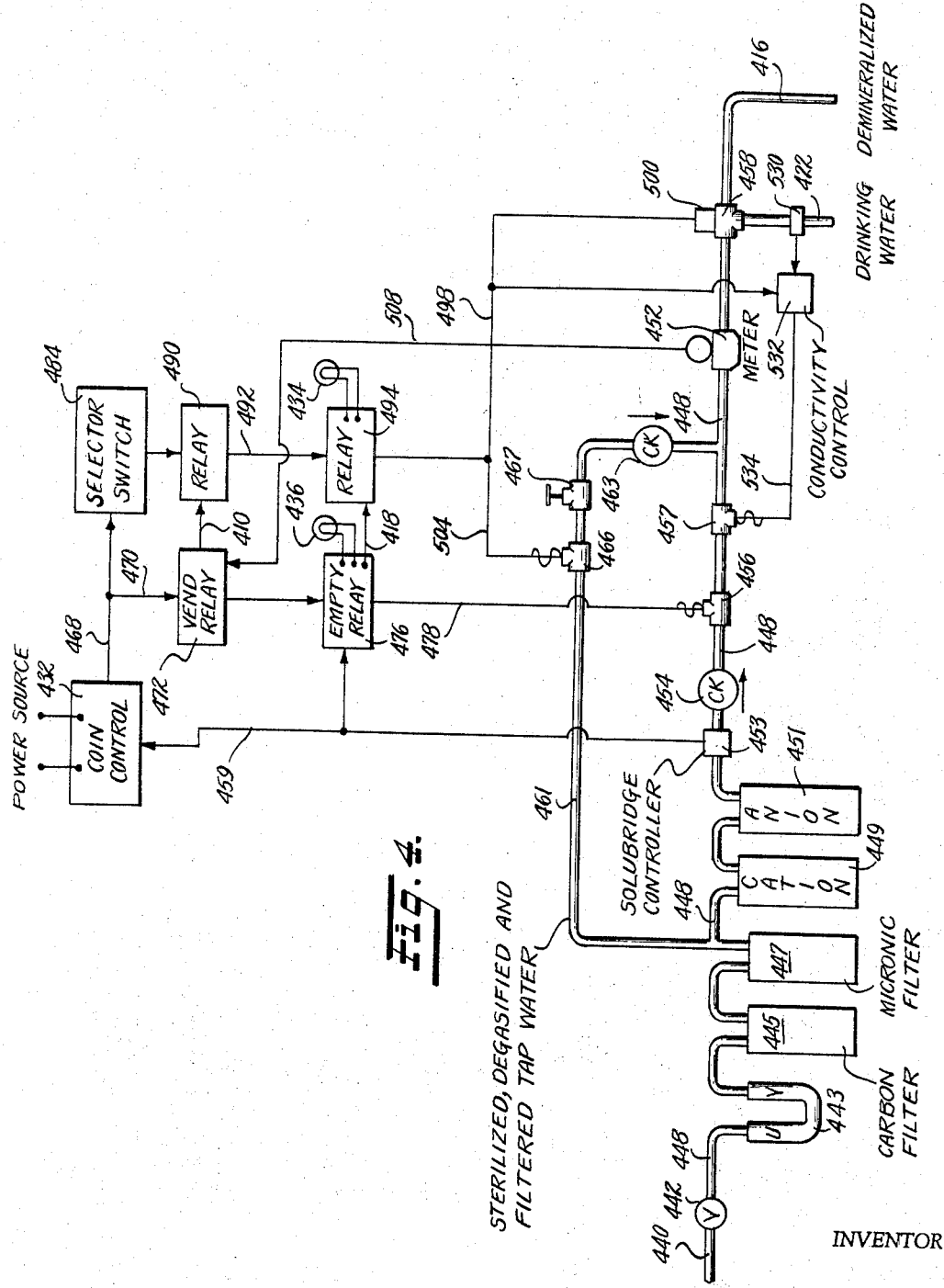

INVENTOR
Sam B. Norris, Jr.
BY Bacon & Thomas
ATTORNEYS

United States Patent Office 3,375,913
Patented Apr. 2, 1968

3,375,913
BALANCED DRINKING WATER VENDORS
Sam B. Norris, Jr., Glendale, Calif., assignor to Foremost Dairies, Incorporated, San Francisco, Calif., a corporation of New York
Filed Jan. 17, 1966, Ser. No. 521,198
21 Claims. (Cl. 194—13)

ABSTRACT OF THE DISCLOSURE

A coin operated machine for vending either demineralized water, or demineralized water to which a predetermined quantity of minerals has been added to make the demineralized water suitable for drinking or other purposes. The machine includes a source of demineralized water, which can be a still, an ion exchange unit, or similar equipment connected to a municipal water line, which source is connected to a coin operated unit for dispensing a measured quantity of water. A source of mineral-containing water is also provided, and is connected to the dispensing unit so that measured quantities of mineral-containing water can be selectively added to the demineralized water as it is being dispensed.

---

This invention relates to a coin controlled water vending machine and in particular to such a machine for the selective vending of either demineralized water or drinking water of balanced mineral content.

In my Patent No. 3,207,282 issued Sept. 21, 1965, I have disclosed a coin controlled vending apparatus for the bulk vending of demineralized water. The present apparatus like that of Patent No. 3,207,282 includes means for purifying water taken from a well, reservoir, municipal water system or other source by removing certain minerals and other impurities therefrom. The apparatus includes demineralization equipment such as ion exchanges or distillation units. However, the machines of the present invention provide a novel combination whereby a customer may obtain either demineralized water suitable for general uses demanding pure or distilled water, such as automobile batteries, steam irons and the like, or drinking water of controlled mineral content or both depending upon the positioning of a selector switch on the vending machine housing.

It will be understood that while the demineralized water vended by the apparatus is of a purity suitable for drinking, the flavor and taste demands of the public dictate the presence of a certain mineral content in high grade drinking water. In the present system this so-called balanced drinking water may be provided by one or two ways. In one embodiment of the invention, a solution containing the desired minerals in relatively high concentration is blended into the purified or demineralized water during the vending cycle upon demand of a selector device provided by the machine. In another embodiment a portion of the mineral containing water from the water source bypasses the demineralizing equipment and is blended back into the demineralized stream during the vending cycle upon demand of the selector. If demineralized water is desired the blending system is rendered inoperative by the selector mechanism. The invention comprises novel control features for accomplishing these functions as well as for safeguarding the customer from loss of his coin deposit should the machine become empty or should a malfunction occur.

The water vending machine is adapted for permanent or temporary installation along highways, in parking areas, parks, motel areas, supermarkets and other locations readily accessible to the public and is supplied with water by connecting it to a municipal water system or other water source.

It is an object of the invention to provide a water vending apparatus which will selectively vend demineralized water as well as drinking water of balanced mineral content.

Another object of the invention is to provide a coin operated water vending apparatus for connection to a local water supply containing undesirably high mineral content and which will selectively vend demineralized water or mineral containing drinking water of lower mineral content than the local source in predetermined measured quantities in response to deposition of a certain coin value.

Another object of the invention is to provide a vending apparatus for selectively dispensing either demineralized water or a purified mineral containing drinking water.

Other objects and advantages of the invention will become apparent from the following detailed description and the accompanying drawings wherein:

FIG. 1 is a front elevational view of a vending apparatus constructed in accordance with the present invention;

FIG. 2 is a diagrammatic illustration of the flow system and control features of one embodiment of the invention;

FIG. 3 is a diagrammatic illustration of a flow system and control system for another embodiment of the invention;

FIG. 4 is a diagrammatic illustration of a flow system and control system for still another embodiment of the invention.

Figure 5:
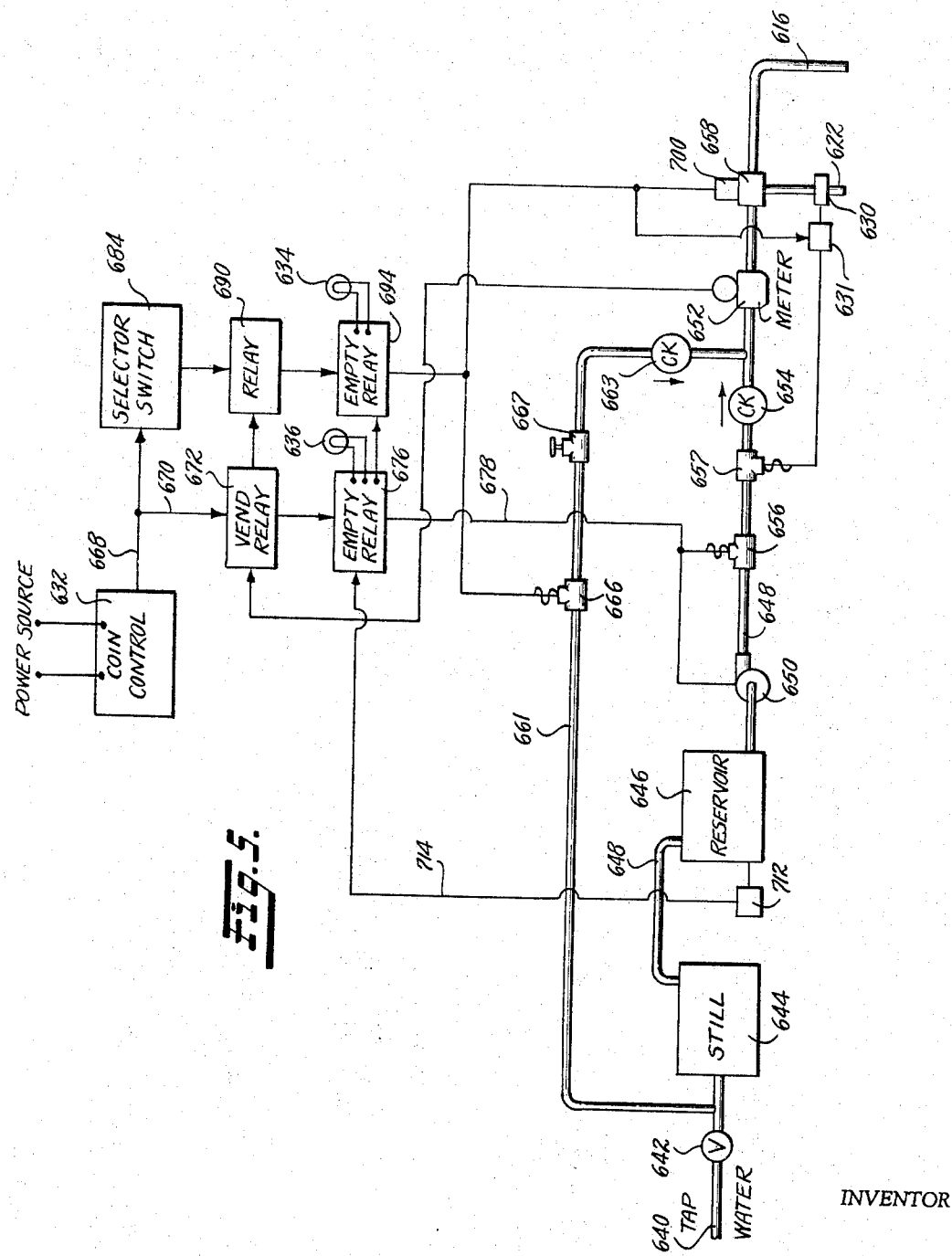
FIG. 5 is a diagrammatic illustration of a flow system and control system for a further embodiment of the invention.

Referring now to the drawings, there is shown in FIG. 1 a vending machine having a housing 10 which is adapted to be bolted or otherwise secured to a base 12. The housing 10 is provided with a water vending station 14 having an outlet 16 adapted to dispense demineralized water into a container, not shown, which may be placed upon a ledge or shelf 18. The housing 10 is also provided with a similar second vending station 20 having an outlet 22 for dispensing drinking water into a container, not shown, which may be placed upon a ledge or shelf 24. The vending stations 14 and 20 are arranged to accommodate a bulk container, such as a one gallon jug, or the like, for the bulk vending of the selected water from either outlet 16 or 22.

A selector knob 26 is provided for positioning by the customer between positions 28 and 30 so that the customer may select either drinking water from the outlet 22 or demineralized water from the outlet 16.

A coin box 32, the face of which is shown in FIG. 1, is provided for deposition of a predetermined coin value whereupon the machine is activated to automatically supply the selected water. The coin mechanism is of conventional type such as may be obtained from the National Rejectors Inc. or other commercial sources. It forms, per se, no part of the present invention but is so connected with the other components of the control system so as to provide a novel combination which will be described in detail below.

The housing 10 is further provided with signal lights 34 and 36 which are designed to light up when the function of the particular vending station with which the light is associated is inoperative, either because of lack of water supply, improper mineral content in the water, or other reasons as will become apparent below. It will be understood that the rear or side portions of the housing 10 are provided with appropriate access openings, not shown, so that the machine can be properly serviced.

FIG. 2 of the drawings illustrates one system which may be installed within the housing 10 shown in FIG. 1. This system is designed to selectively vend distilled water and a drinking water of balanced mineral content which is prepared by injecting a fixed amount of a concentrated solution of mineral salts of predetermined composition into the distilled water during the vend operation when the selector knob is properly positioned. In this manner, distilled water is sold from the station 14 through the outlet 16 and drinking water of controlled total mineral content of constant composition is sold from dispensing station 20 through outlet 22.

It will be understood that the term demineralized water refers to water from which the minerals have been substantially completely removed either by distillation, ion exchange, or other means.

Referring now to FIG. 2, a conduit 40 designated as a raw water line is adapted to be connected by means not shown to a raw water supply, which may be a municipal source, a well, or other source providing water of undesirably high mineral content. The mineral content calculated as total dissolved solids for example may be 150 parts per million (p.p.m.) to 1000 p.p.m. or greater. Water of such mineral content is commonly encountered in many areas of the world.

A valve 42 permits the raw water to be supplied to distillation unit 44 which may be of the automatic type such as illustrated and described in detail in my Patent No. 3,207,282. This unit supplies distilled water to a reservoir 46 and preferably is designed to automatically maintain a predetermined water level in said reservoir. Distilled water is pumped during a vend operation from the reservoir 46 through conduit 48 by an electric motor-controlled pump 50 and is passed through a flowmeter 52, check valve 54, solenoid valve 56, and selector controlled valve 58 to either the outlet 16 or the outlet 22 depending upon the position of the selector knob 26.

A concentrated mineral solution, contained in an auxiliary reservoir 60, is connected by means of conduit 62, adjustable metering pump 64, and solenoid valve 66 to the line 48 through which distilled water is supplied. As shown, the mineral solution line 62 and distilled water line 48 are connected just upstream from solenoid valve 56 in the distilled water supply line.

The coin control box 32 is connected to a power source as shown. Deposition of a given coin value in coin box 32 is adapted to provide a circuit through lines 68 and 70, vend relay 72, line 74, empty relay 76, line 78 and line 80 to the motor of pump 50. At the same time a circuit is provided to normally-closed solenoid valve 56 through line 82 whereby, when the motor of pump 50 is energized, the valve 56 is also opened.

Normally, the selector controlled valve 58 is in a position to connect distilled water supply conduit 48 to the outlet 16. The selector knob 26 on the front of housing 10 is connected to selector switch 84 so as to close this switch when the knob is positioned against the stop 28 and to open it when positioned against stop 30. However, the system is arranged so that selector switch 84 can complete a circuit through line 88 to close the relay 90 only when a proper coin value is deposited in coin box 32. When this occurs with selector switch 84 closed, the relay 90 closes thereby completing a circuit through line 92, normally closed relay 94, line 96 and line 98 to solenoid motor 100 of the valve 58. The motor 100 shifts the positions of the valve 58 so as to connect line 48 to outlet 22. The valve motor 100 when deenergized returns the valve 58 to its normal position as by spring action, or the like.

When the line 96 is energized, normally-closed solenoid valve 66 is opened by energy through lines 102 and 104 and the metering pump 64 is started by reason of energy supplied through line 106.

It will be seen therefore that with the selector switch adjacent stop 28, both solenoid valves 56 and 66 are opened and both pumps 50 and 54 are started when the proper coin value is deposited. Mineral solution from reservoir 60 will then be blended with distilled water from reservoir 46 and dispensed through outlet 22. This continues until a predetermined quantity of water, e.g. one gallon, has been dispensed as measured by flowmeter 52. At this point an electrical signal from the flowmeter is supplied through line 108 to vend relay 72 and also through connecting line 110 to vend relay 90. These vend relays break the circuits to the respective valves and pumps and reset the system for a subsequent operation as determined by further coin deposition in coin box 32.

Safety features in this system include a means 112, which may be a fluid pressure operated switch, responsive to low liquid level in the distilled water reservoir 46 to provide an electrical signal through line 114 and line 116 to empty relay 76 whereby this relay breaks the circuit between lines 74 and 78 rendering dispensing of further distilled water impossible and also completing a circuit to the signal light 36 which warns the customer that the device is sold out. The empty relay 76 is connected by means of line 118 to empty relay 94 so that this relay also breaks the circuit between lines 92 and 96 so that no mineral solution can be dispensed when there is no distilled water for the blending operation. A circuit to signal light 34 is also completed. At the same time a circuit is completed to the coin control mechanism through line 120 to thereby inactivate the coin control mechanism whereby any deposited coins are returned to the customer. It will be understood that the various relays and other components, like the coin control mechanism, are connected by means, not shown, to the power line and control energy from this source to the various motors, solenoid valves, signal lights, etc. Those skilled in the art will understand the operation of the vend and empty relays and the manner in which they are combined with the coin control and selector mechanism. The construction of the individual components is conventional and comprises no part of the present invention. Reference, however, is made to my Patent 3,207,282 for the details of typical coin control mechanisms, vend and empty relays and other components which may be modified in obvious manner for incorporation into the present system.

The mineral solution reservoir 60 is also provided with a means 122, e.g. a fluid pressure operated switch, for determining low liquid level and rendering the vending of mineral solution inoperative. This means, in response to low liquid level, provides an electrical signal through line 124 to empty relay 94 and signal light 34. Accordingly, the dispensing of mineral solution can be stopped without effecting the dispensing of distilled water so that a customer can obtain distilled water, if he so desired, by the proper positioning of the selector switch against the stop 30. In this instance only the light 34 would be energized indicating to the customer that distilled water could still be obtained.

A typical operation of the system shown in FIG. 2 is as follows: Assuming a customer desires distilled water, he sets the selector switch against the stop 30 so that the selector control valve 58 will remain connected to the outlet 16. The proper coin value is then deposited by the customer which causes the coin control mechanism and associated circuitry to open the solenoid valve 56 and start the pump 50. The meter 52 is preset to allow a gallon of distilled water to pass, at which time vend relay 72 will open the circuit causing solenoid valve 56 to close and the pump 50 to stop. It will be understood that solenoid valve 66 remains closed during the distilled water sale. Check valve 63 prevents back flow of distilled water into the solution line which would otherwise disturb solution concentration. The outlets 16 and 22 and other conduits are preferably sloped downward downstream from valve 58 so that all product drains from the outlets.

When drinking water is the product desired, the selector knob 26 is positioned adjacent stop 28 by the customer and the valve 58 is automatically set to the outlet 22 as soon as the proper coin value is deposited in the coin control box 32. Deposition of the coins in this instance causes the distilled water supply operations to function in exactly the manner as previously described and in addition, causes mineral solution from reservoir 60 to be metered into the distilled water by means of the metering pump 64 through the now open solenoid valve 66.

The pump 64 may be a conventional positive displacement metering pump which has an adjustable stroke. The mineral solution in reservoir 60 is prepared by the incorporation of selected minerals into pure water, the selected minerals being those which are beneficial to the human system and which provide the water with the characteristic taste of good drinking water. Such minerals may include the chlorides and sulfates of calcium, magnesium and sodium. If desired, soluble salts of other minerals generally regarded as beneficial, such as iron and manganese, may be included. Fluorides, e.g. stannous fluoride may be incorporated where it is desired to provide fluorine for the prevention of dental caries.

It will be understood that the stroke of the metering pump 64 is preset so that the pump will inject the proper amount of solution to result in a product of the desired total mineral content in the blended stream. This may, for example, be in the range of about 50 to 150 parts per million total dissolved solids. The concentration of the mineral solution is normally such that only a small quantity is required during the blending cycle. For example, the concentration may be such that only one to ten cubic centimeters of mineral solution are required during a one gallon vend. Accordingly, the customer's container is not overfilled when the drinking water is dispensed. As before, the flow control meter 52 will stop the vending of water when the desired amount, e.g. one gallon of water has been dispensed. The signal from this meter through line 108 causes vend relay 72 and vend relay 90 to open the respective circuits whereby valves 56 and 66 are closed and pumps 50 and 64 are stopped.

Normally the distillation unit 44 will automatically supply sufficient water to reservoir 46 for continuous vending operations. However, should the water level in the reservoir get too low, the low level control means 112 will deactivate the coin control box 32, so that any coins deposited are returned, and will open the empty relays 76 and 94 as well as energizing both signal lights 34 and 36. If the lights do not go out within a reasonable time, the machine should be serviced. Low level in the solution reservoir 60 cuts out the mineral supply system and lights warning light 34 but does not deactivate the coin box. Therefore, distilled water can still be sold even though the solution reservoir 60 is empty. However, the mineral solution reservoir should be replenished, this being accomplished manually.

The embodiment shown in FIG. 3 of the drawings is similar to that shown in FIG. 2 except that in this instance the distillation unit 44 and distilled water reservoir 46 are replaced by a purification system including filters and ion exchange units. The sold-out circuitry is also different in that a conductivity controller reactivates the coin box and turns on both sold-out lights in the event that water emits from the de-ionizers which has a mineral content above a preset value. In case the solution reservoir becomes exhausted the drinking water sold-out light is activated and the dispensing means for concentrated solution is prevented from operation.

Referring now to FIG. 3 in detail, there is shown a raw water supply line 240, valve 242, ultraviolet irradiator sterilizer 243, a carbon filter 245, a micronic filter 247, a cation exchange unit 249, an anion exchange unit 251, a Solubridge controlled 253, a flow control meter 252, check valve 254, solenoid control valve 256, and selector valve 258 which is connected to the respective outlets 216 and 222. The elements named are connected in series to provide sterilized, purified, demineralized water which is generally equivalent to distilled water. Each of the purifying means is conventional in the art and require no further description. The Solubridge controller 253 acts on a conductivity principle and is adapted to provide an electrical signal through lines 214 and 220 to coin control mechanism 232 and through lines 217 and 218 to empty relays 276 and 294 and associated warning lights 236 and 234 should the conductivity of the water from the ion exchange units exceed a certain preset maximum, for example, corresponding to 10 parts per million total dissolved solids. In such instance the coin control mechanism is deactivated and any deposited coins returned to the customer, the vending operation is prevented and the warning lights are turned on. As in the system shown in FIG. 2, the selector valve 258 normally connects the water supply line to demineralize water supply outlet 216.

The system of FIG. 3 provides a solution reservoir 260 for concentrated mineral solution as before which is dispensed by adjustable metering pump 250, through solenoid valve 266, and check valve 263 into the line 248 which supplies demineralized water.

As in the system shown in FIG. 2, the system of FIG. 3 is provided with a circuit from the coin control box 232 through line 268, line 270, vend relay 272, line 274, empty relay 276, and line 278 to the solenoid valve 256. The empty relay 276 is connected to signal light 236. The circuit from the coin control box 232 is also connected through line 286, selector switch means 284 responsive to selector knob 26, line 288, relay 290, line 292, empty relay 294 and line 298 to valve motor 300 which controls the position of the selector valve 258. The selector circuit is also connected through line 302 and line 304 to solenoid valve 266, and through line 306 to adjustable metering pump 250. The empty relay 294 is connected to the signal light 234.

A typical operation of the system of FIG. 3 is as follows: valve 242 is normally open connecting the system to pressured source of raw water of undesirably high mineral content. Assuming that the selector control knob 26 (FIG. 1) is positioned adjacent stop 30, the customer, upon deposition of the selected coin value, will cause a circuit to be completed from the coin control box 232 which will open the solenoid valve 256. The pressure of the system will then cause water to be forced through the sterilizer 243, where it is freed of any harmful bacteria, through carbon filter 245 where it is freed of dissolved chlorine or other gases or organic contaminants, through micronic filter 247 where any undissolved suspended solids are removed, through cation and anion exchange units 249 and 251 for demineralization, and thence through Solubridge controller 253, meter 252, check valve 254, valve 256 and valve 258 to be dispensed from outlet 216 into the customer's container. As soon as the measured quantity of water, e.g. one gallon, has passed through the flowmeter 252, a signal through line 308 will cause vend relay 272 to open the circuit thereby causing solenoid valve 252 to close.

Assuming that the customer had selected drinking water by positioning selector knob 26 to the stop 28, the same operation as previously described would be initiated by the deposition of the proper coin value in the coin control box 232 and in addition a circuit would be completed through line 286, selector switch 284, line 288, relay 290, line 292, relay 294, and line 298 to the valve motor 300 whereby the selector valve 258 would connect the supply line to outlet 222. At the same time the circuit through lines 302, 304 and 306 would be energized causing solenoid valve 266 to open and metering pump 250 to start. The predetermined quantity of mineral containing solution would the be metered into the demineralized water thereby providing the desired blended drinking water from line 222. A signal from flow control meter 252 at the end of the vending cycle causes vend relay 272 to open the circuit to solenoid valve 256 and the relay 290 to open the circuit to solenoid valve 266 and pump 250. At the same time the circuit through line 298 is broken and the valve 258 is returned to its normal position.

Should the conductivity of the water from the ion exchange units exceed the predetermined maximum of e.g. 10 p.p.m. total dissolved solids, the Solubridge controller 253 will render the system inoperative, warn the customer by signal lights 236 and 234 that the machine is empty and indictae that the ion exchange units need replacing or servicing. The solution reservoir empty signal by means of low level switch 322, line 324, empty relay 294 and signal light 234 is the same as described in connection with FIG. 2.

The embodiment shown in FIG. 4 utilizes the bypass concept for blending sterilized, degasified, and filtered tap water of relatively high mineral content with sterilized, degasified and filtered tap water from which dissolved minerals have been removed. The system as illustrated provides an automatic control to maintain the total mineral content of the drinking water within a desired range, e.g. from 50 to 150 parts per million of total dissolved solids.

Referring now to FIG. 4 in detail there is shown a water supply line 440 which is connected to supply tap water or the like to the system through valve 442. Flow line 448 contains an ultraviolet sterilizer 443, a carbon filter 445, a micronic filter 447, cation exchange unit 449, anion exchange unit 451, conductivity responsive means or Solubridge controller 453, check valve 454, solenoid valve 456, another solenoid control valve 457 which operates between partially open and fully open positions, flow control meter 452 and selector valve 458. The selector valve, as before, is connected to the supply line 448 to selectively connect it to either demineralized water outlet 416 or drinking water outlet 422.

This system includes bypass water line 461 which is connected to the water supply line 448 just ahead of the ion exchange units. This bypass line 461 contains a solenoid valve 466, a manually settable valve 467, and a check valve 463. It re-enters the water supply line 448 downstream from the ion exchange units and just ahead of the flowmeter 452.

The system, as in the previous embodiments, operates in response to coin deposition in the coil control mechanism. Coin control box 432 is designed to complete a circuit through line 468, line 470, vend relay 472, empty relay 476 and line 478 to solenoid valve 456. The system also includes selector switch 484 which as before makes or breaks a circuit through relay 490, line 492, relay 494, and line 504 to solenoid valve 466 in the bypass line 461. When the selector knob 26 (FIG. 1) is properly positioned to call for drinking water, a circuit is also completed through line 498 to selector valve motor 500 which positions the valve 458 to the outlet 422 for drinking water.

The flowmeter 452 is connected by line 508 to vend relay 472 so as to open the relay 472 when a predetermined quantity of water has passed through the water supply line 448. At the same time the vend relay 472 is reset for another operation and through line 418 relay 490 is caused to open and reset for the next operation. Should the water coming through the ion exchange units become undesirably high in dissolved mineral content by reason of partial exhaustion of the ion exchange units, the Solubridge controller 453 will cause a signal to be passed through line 459 to the empty relay 476 thereby opening the relay and breaking the vending circuit, thereby causing solenoid valve 456 to close. Light 436 is adapted to light in this instance. The empty signal will also be passed through line 418 to relay 494 causing this relay to open the circuit in the bypass system thereby causing solenoid valve 466 to close. Warning light 434 will also be lit indicating that the device is inoperative for dispensing either drinking water or demineralized water. In this instance any deposition of coins in the coin control box will be returned to the customer.

The system of FIG. 4, as aforementioned, is designed to automatically control the total dissolved mineral content dispensed through the drinking water outlet 422. The apparatus for accomplishing this includes the manually adjustable valve 467, a conductivity sensing means 530 and a conductivity control unit 532 which is connected through line 534 to the partially open solenoid valve 457. The solenoid valves 456 and 466 are normally closed but are designed to be fully opened when energized. With these valves fully open and the solenoid valve 457 partially open the manual valve 467 can be preadjusted to blend the necessary amount of mineral containing water through the bypass line 461 into the demineralized water passing through line 448 to provide an approximate desired mineral content. For example, assuming that the raw water coming in through supply 440 contains about 400 parts per million of total dissolved solids and that the ion exchange unit removes all but about ten parts per million of total dissolved solids, the manual valve 467 would be adjusted so as to add enough of the mineral containing water to raise the total mineral content of the water in line 448 as supplied to outlet 422 to about 75 parts per million. The solenoid valve 457 is constructed and arranged so that in its normal position it is partially opened and upon energizing through line 534 is then opened to a fully open position. In the event that the total dissolved solids in the water passing through outlet 422 exceeds a maximum of e.g. 150 parts per million as sensed by the conductivity control element 530, the conductivity control apparatus 532 causes valve 457 to be energized through line 534 so as to open this valve to its fully open position thereby allowing more demineralized water to flow through line 448 to compensate for the undesirable rise in mineral content in the blended stream. When the conductivity of the blended stream decreases below the predetermined level, e.g. 150 p.p.m. TDS, the valve 457 returns to its normal position. It will be understood that there are many different devices for effecting this control. The conductivity control device 532 may, alternatively, be of a known type which causes a pulsing signal to be generated whereby the solenoid valve 457 would pulse between partially open and fully open position. In this instance additional quantities of demineralized water would be pulsed into the system and temporary over-compensation with respect to quantity of demineralized water would be avoided.

Briefly reviewing the operation of the system shown in FIG. 4, it will be seen that when the selector knob 26 is turned for demineralized water, selector switch 484 will be open and valve 466 in the bypass line 461 will be closed. Deposition of the proper coin valve in the coin control unit 432 then causes a vending operation through line 448 by opening solenoid valve 456 so that demineralized water flows through the outlet 416. As soon as the proper quantity of water has been dispensed as measured by flowmeter 452, this meter causes vend relay 472 to open whereby the apparatus is ready for another dispensing operation. Now assuming that the selector switch 26 is set to vend drinking water and the proper coin value is deposited in box 432, the valve 458 will be turned to outlet 422 and both solenoid valves 456 and 466 will open. The flowmeter will permit the proper quantity of blended water to be dispensed through line 422 at which point both relays 472 and 490 will be opened and the valve 458 will return to outlet 416.

The system shown in FIG. 5 is similar to that shown in FIG. 4 except in this instance a distillation unit is used for providing demineralized water in lieu of the ion exchange units. As shown in this figure, tap water entering through line 640 and valve 642 is supplied to still 644 which automatically maintains a supply of distilled water in reservoir 646. Water from the reservoir 646 is pumped by pump 650 through line 648, solenoid valve 656, control valve 657, check valve 654, flowmeter 652, and selector valve 658 to outlet 616 for demineralized water. The system is provided with a bypass line 661 which is connected to the raw water line just upstream of the still and re-enters the water line 648 just ahead of the flowmeter 652. Bypass line 661 is provided with a solenoid valve 666 and a manually operable control valve 667. A check valve 663 is provided as before. The vend system includes coin control box 632 connected through line 668 and 670 to vend relay 672 which in turn controls the operation of pump 650 and the opening of solenoid valve 656. Empty relay 676 is connected in the system as previously described. The selector switch 684, relay 690, and empty relay 694, in the blend circuit is interconnected in the system in the same manner as described with previous figures. The position of the selector knob 26 determines whether or not valve 666 in the bypass line 661 will be opened or closed. The proper proportioning of mineral containing tap water through line 661 with distilled water through line 648 to provide drinking water of the proper mineral content at outlet 622 is controlled as previously described by means of preset manually adjustable valve 667 and automatic conductivity control through sensing means 630, conductivity controller 631, and partially opened solenoid valve 657.

As in the device shown in FIG. 2, a safety feature includes pressure operable switch 712 which detects low water level in reservoir 646 and, by means of a signal through line 714, causes empty relay 676 and empty relay 694 to open at the same time flashing on the warning lights 634 and 636. If desired, an ultraviolet sterilizer, a carbon filter and, micronic filter, as illustrated in FIG. 4, may be incorporated in the bypass line 661 so as to remove bacteria, dissolved chlorine or other gases or organic matter, and suspended solids in the event that the water source from raw water supply 640 is not of sufficient purity required for drinking purposes.

It will be apparent to those skilled in the art that many variations of the systems illustrated are possible without departing from the spirit and scope of the invention. The embodiments of the invention in which an exclusive property or privilege is claimed are defined as follows:

1. A coin operated vending machine comprising the combination of:
   demineralizing means for providing a source of demineralized water, coin control means, means for dispensing a predetermined quantity of demineralized water from said source in response to the deposition of a certain coin value in said coin control means, a source of water containing dissolved minerals of the type present in drinking water, and means for adding a quantity of said mineral-containing water into said predetermined quantity of demineralized water as it is dispensed in response to said coin deposition thereby to provide a drinking water of controlled mineral content.

2. The vending apparatus of claim 1 including selector means for controlling the addition of the mineral-containing water into the demineralized water whereby the customer may select either demineralized water or drinking water.

3. The vending apparatus of claim 1 wherein the demineralized water contains less than 10 p.p.m. of dissolved minerals, the mineral-containing water contains more than 150 p.p.m. of dissolved minerals, and the means for adding said mineral-containing water to the demineralized water includes means to control the quantity of dissolved minerals in the mixed product drinking water at a level within the range of about 50 to 150 p.p.m.

4. The vending apparatus of claim 1 comprising an adjustable metering pump for metering a predetermined quantity of the mineral-containing water into the demineralized water.

5. The vending apparatus of claim 3 wherein the means to control the quantity of dissolved minerals in the mixed product drinking water include conductivity sensing means for sensing a change in mineral level of the mixed product drinking water to a value outside of the 50 to 150 p.p.m. range to thereby produce an electrical signal and wherein the apparatus includes means responsive to said signal to adjust the relative flow of demineralized water and mineral-containing water to restore the mineral level in the mixed product to the desired range.

6. The apparatus of claim 1 wherein the demineralizing means comprises a distillation unit.

7. The apparatus of claim 1 wherein the demineralizing means includes an ion exchange unit.

8. The apparatus of claim 1 wherein the source of mineral-containing water comprises means connecting said vending machine with an outside water supply line.

9. The apparatus of claim 8 including means for sterilizing, degasifying and filtering the mineral-containing water drawn from said outside water supply line.

10. The apparatus of claim 9 wherein the sterilization means comprises an ultraviolet irradiator.

11. A coin operated vending machine for selectively dispensing demineralized water and drinking water of controlled mineral content, comprising: means including a demineralization unit for providing demineralized water under pressure, an outlet for dispensing demineralized water, a demineralized water supply conduit connecting the demineralization unit with said outlet, a flowmeter and a normally closed solenoid valve in said supply conduit, a reservoir for storing a mineral solution, a conduit connecting the solution reservoir to said demineralized water supply conduit; an adjustable electric motor driven metering pump and a normally-closed solenoid valve in said solution conduit, coin control means, circuit means responsive to deposition of a given coin value in said coin control means to complete a circuit starting said pump and opening said normally-closed solenoid valves, means responsive to said flowmeter to open said circuit means upon flow of a predetermined quantity of water through said flowmeter thereby causing said solenoid valves to close and said pump to stop, and selector means for selectively opening the circuit to the adjustable metering pump and solenoid valve in the mineral solution supply conduit whereby by positioning said selector means a customer may select either demineralized water or water containing a controlled quantity of minerals.

12. The apparatus of claim 11 including means responsive to low liquid level in the mineral solution reservoir to open the circuit to the adjustable metering pump and solenoid valve in the mineral solution conduit and to visually indicate that mineral-containing water is sold out.

13. The apparatus of claim 11 wherein the demineralization unit includes a still, a reservoir for distilled water and an electric motor driven pump for supplying distilled water to said demineralized water supply conduit, and including means responsive to low liquid level in the distilled water reservoir to open the circuit to the pumps and solenoid valves in both conduits and to visually indicate that both demineralized water and mineral-containing water are sold out.

14. The apparatus of claim 11 comprising a separate outlet for dispensing mineral-containing water, a selector valve selectively connecting the outlet for demineralized water and the outlet for mineral-containing water to the supply conduit, said selector valve being positionable in response to said selector means to connect the supply conduit to the outlet for demineralized water when the circuit to the metering pump and solenoid valve in the mineral solution conduit is open and to connect the supply conduit to the outlet for mineral-containing water when the circuit to the metering pump and solenoid valve in the mineral supply conduit is closed.

15. The apparatus of claim 11 wherein the demineralized water supply conduit contains conductively sensing means and including means responsive to a predetermined conductivity level to deactivate the coin control means, open the circuit to the pumps and solenoid valves in both conduits and to visually indicate that both demineralized water and mineral-containing water are sold out.

16. A coin-operated water vending machine for selectively dispensing demineralized water and drinking water of controlled mineral content comprising: a vending station having an outlet for demineralized water and an outlet for drinking water, a control valve selectively connecting a water supply line to said outlets, selector means for controlling the operation of said control valve whereby a customer may connect said water supply line to a selected outlet, coin control means, means in said water supply line for metering a predetermined quantity of water in response to deposition of a proper coin value in said coin control means, means for connecting said water supply line to a source of raw water containing dissolved minerals, said water supply line containing means for sterilzing, degasifying and filtering said raw water and means for demineralizing the sterilized, degasified and filtered water, means for blending the demineralized water with the sterilized, degasified and filtered mineral-containing water including a bypass conduit around the demineralizing means, a normally-closed solenoid valve in the bypass conduit and a normally closed solenoid valve in the water supply line, means for opening the solenoid valve in the water supply line during the metering cycle, and means for opening the solenoid valve in the bypass conduit during the metering cycle only when the selector means is in a position connecting said first solenoid valve to the drinking water outlet.

17. A coin operated vending machine for selectively dispensing demineralized water and drinking water of controlled mineral content comprising: a demineralization unit comprising ion exchange means, means for connecting said demineralization unit to a source of mineral containing water under pressure, an outlet for dispensing demineralized water, a demineralized water supply conduit connecting the demineralization unit with said outlet, a normaly-closed solenoid valve and a flowmeter in said demineralized water supply conduit, a bypass conduit around said demineralization unit connecting the source of mineral containing water with the demineralized water supply conduit, a normally-closed solenoid valve in said bypass conduit, coin-control means, circuit means responsive to deposition of a given coin value in said coin control means to complete a circuit opening said normally-closed solenoid valves, means responsive to said flowmeter to open said circuit means upon flow of a predetermined quantity of water through said flowmeter thereby causing said solenoid valves to close, and selector means for selectively opening the circuit to the solenoid valve in the bypass conduit whereby by positioning said selector means a customer may select either demineralized water or blended water containing minerals.

18. The apparatus of claim 17 wherein one of said conduits contains adjustable means for regulating the flow of demineralized water with respect to mineral containing water when both solenoid valves are open.

19. The apparatus of claim 17 comprising a separate outlet for dispensing the blended water containing minerals, a selector valve selectively connecting the outlet for demineralized water and the outlet for blended water to the supply conduit downstream from the bypass conduit, said selector valve being positionable in response to said selector means to connect the supply conduit to the outlet for demineralized water when the circuit to the solenoid valve in the bypass conduit is open and to connect the supply conduit to the outlet for blended water when the circuit to both solenoid valves is closed.

20. The apparatus of claim 19 comprising conductivity sensing means in the outlet for blended water, regulator valve means in one of said conduits, and means responsive to said conductivity sensing means to automatically control said regulator valve to maintain a selected mineral level in said blended water.

21. The apparatus of claim 19 comprising conductivity sensing means in the supply conduit for demineralized water adjacent the demineralization unit, and means responsive to a predetermined maximum conductivity from said sensing means to open the circuits to said solenoid valves, deactivate the coin control means and provide a visual sold out signal.

References Cited

UNITED STATES PATENTS

| | | | |
|---|---|---|---|
| 2,209,487 | 7/1940 | Wagner | 210—25 |
| 2,379,753 | 7/1945 | Sebald | 210—48 |
| 2,711,995 | 6/1955 | Sard | 210—25 |
| 2,725,482 | 11/1955 | Levinson et al. | 21—2 |
| 2,980,224 | 4/1961 | Bookout et al. | 194—13 |
| 3,207,282 | 9/1965 | Norris | 194—13 |
| 3,221,859 | 12/1965 | McAbee | 194—3 |

STANLEY H. TOLLBERG, *Primary Examiner.*